May 13, 1958     A. O. RUSSELL ET AL     2,834,395
APPARATUS FOR JOINING THERMOPLASTIC SHEETS
Filed Dec. 10, 1954
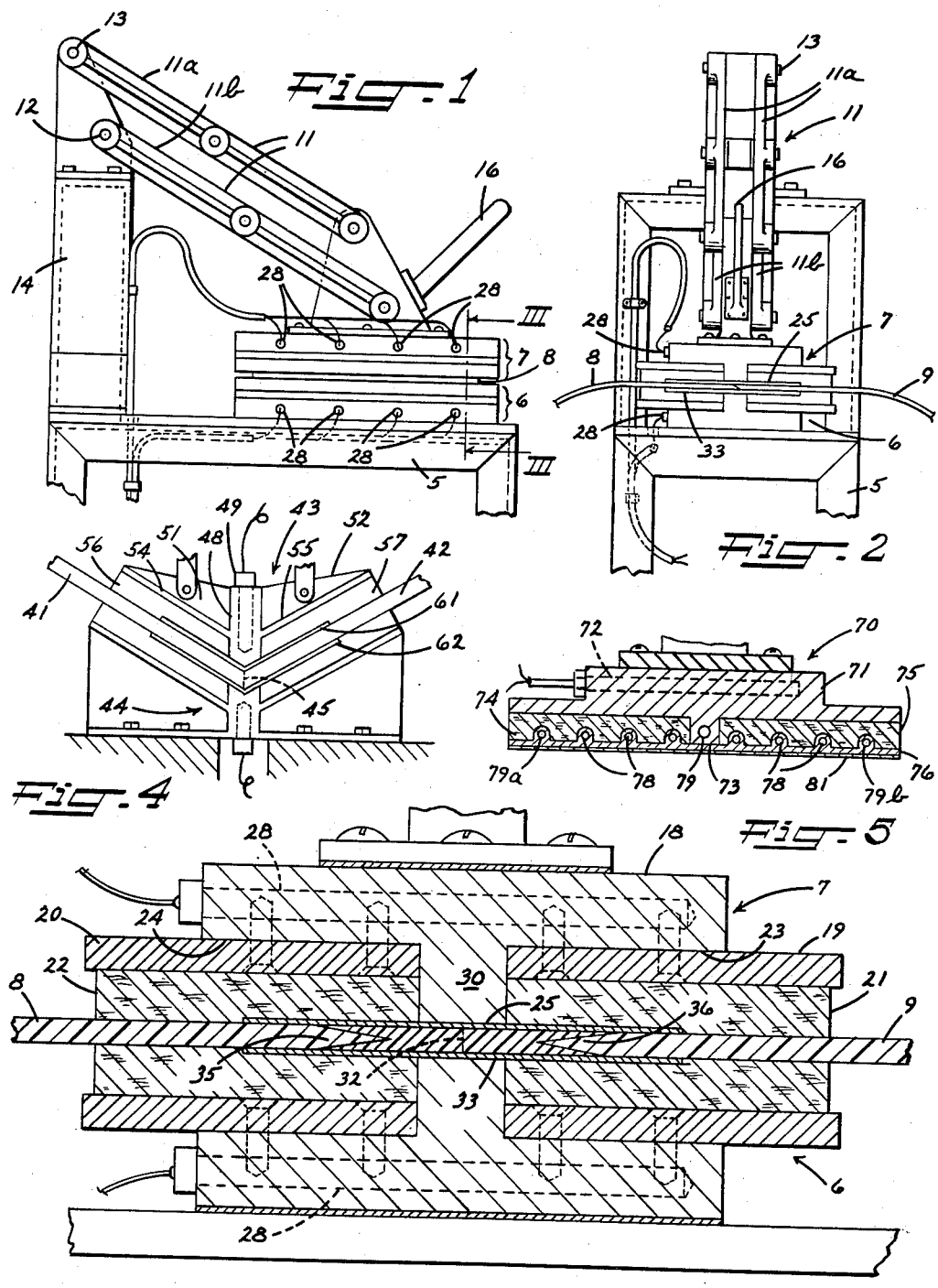

United States Patent Office 2,834,395
Patented May 13, 1958

2,834,395

APPARATUS FOR JOINING THERMOPLASTIC SHEETS

Arthur O. Russell and Michael Gravatt Jones, Fredericksburg, Va., assignors to American Viscose Corporation, Philadelphia, Pa., a corporation of Delaware Application December 10, 1954, Serial No. 474,365

2 Claims. (Cl. 154—42)

The present invention relates to an apparatus for joining sheets of thermoplastic material in edge to edge relationship. The invention has particular utility in joining thermoplastic sheets of relatively heavy gage, such as thicknesses of ¼ or ½ inch which might, for example, be used in making processing belts. The thermoplastic flexible materials contemplated are those such as polyvinylchloride, polyvinylacetate, polyvinylidene chloride, copolymers thereof, polyethylene, and the polyamides.

Heretofore, it has been difficult to join heavy gage sheets of the above materials in joints formed according to the same thickness as the parent sheets and free from mold marks. According to the prior art, it is possible to make joints of this general quality by a somewhat tedious procedure requiring equipment in which the thickness of the joint is determined, for example, by spacers or other means for maintaining the spacing of heatable joint-molding members. However, no clear-cut procedure has been discovered in the prior art by which such joints might be produced completely free from mold marks or other surface imperfections.

It is an object of the present invention to provide an improved apparatus for joining two sheets of thermoplastic material together as a result of coalescence or welding together of their edge-portions.

It is also an object to provide apparatus for welding two sheets together without the necessity for positively or rigidly spacing portions of the apparatus by elements of the apparatus itself in order to obtain the desired thickness of the joint.

It is another object to provide an apparatus for connecting thermoplastic materials in a manner as to form joints entirely uniform in thickness, constructed to thickness of the parent sheets, and entirely free of mold marks.

Other objects, features, and advantages will be apparent in the following description of the invention and the drawing relating thereto in which Fig. 1 is a side elevation of the apparatus of the invention;

Fig. 2 is an end view of the apparatus shown in Fig. 1;

Fig. 3 is a fragmentary section view taken along line III—III of Fig. 1;

Fig. 4 is a fragmentary section view of a modified apparatus; and

Fig. 5 is a fragmentary section view of another modified apparatus.

Briefly stated, the invention resides in apparatus in which edge portions of thermoplastic sheet materials are placed in substantially parallel engaged relation between two assemblies of improved construction which have parallel surfaces, preferably rectilinear, for engaging the sheet material and adapted for movement toward each other to place the heated material under compression. Each assembly comprises a thin flat plate of metal or other heat-conducting material and a platen comprising a heat-conducting body and a pair of heat-insulating members separated by an extension or projection of the body. The members and the body portion disposed therebetween define, in a preferred embodiment, a flat surface against which the member is normally supported. The strip-like portion of the flat platen surface defined by the body extension or projection is elongate in a direction parallel to the adjacent end surfaces of the heat-insulating members separated thereby, and centered over the path along which the joint in the sheet material is to be positioned within the apparatus.

In forming the joint, the sections of sheet material are placed between the pair of assemblies with the edges of the sections in abutting, or slightly-overlapping, engaged relationship, and in parallel adjacent relation to the path. The material is subjected to compression resulting from urging the assemblies together. The bodies of the platens are heated, and in turn, heat the middle portions of both plates. As these portions of the plates extend in coextensive relation to the path along which the joint is formed, the material of the sheet sections in contact therewith is heated until it fuses within a limited region adjacent the path, and the material of both sections coalesces to form a homogeneous joint. The projecting body portions constitute a restricted path through which heat may travel from a heat source within the platen bodies into the plates and then into the material of the sheet sections, but primarily into that sheet material disposed between, and immediately adjacent, the opposed projecting body portions. An essential function of each plate is that it extends as a bridge from a surface of unsoftened material of one section to the surface of unsoftened material of the other section while supporting and molding the intermediately disposed fused material. When the desired fused condition is reached within the joint, the platens are separated and the assembly comprising the joined sheet sections and the plates adhering thereto is allowed to cool to a temperature below that for substantially softening of the sheet material whereupon the plates are removed from the joined sheet material.

An example of a specific apparatus embodying the invention is illustrated in Figs. 1, 2, and 3 comprising a stand 5 on which is fixidly mounted a platen 6. Another platen 7 resting on sheet sections 8 and 9 is supported for movement toward and away from the platen 6 by a parallel-bar mechanism 11 which maintains the under surface of the platen 7 at all elevations thereof parallel to the upper surface of the platen 6. Members 11a and 11b pivot at 12 and 13 with respect to the vertical post 14 of the stand 5. The upper platen is provided with a handle 16 for manually moving it toward or away from the lower platen.

The platens, considered independently of respective supporting structure, are similar in construction, and a detailed description of the platen 7 will suffice for the platen 6. Referring now to Fig. 3, the platen 7 comprises a heat-conductive body 18, a pair of backing plates 19 and 20 and a pair of heat-insulators 21 and 22. The apparatus illustrated by Figs. 1, 2, and 3 is designed to join sheet materials into a generally planular rectilinear product. Thus, the backing plates 19 and 20 are of flat construction and secured against flat undersurfaces 23 and 24 of the body 18. The insulators 21 and 22 are likewise of flat rectilinear construction although the undersurfaces of the insulators may be preferably recessed, as shown in Fig. 3, to receive a thin heat-conducting plate 25.

The body 18 is preferably constructed of a material that renders it an efficient heat-conductor. The backing plates 19 and 20 may be formed integrally with the body. However, in the embodiment shown, they are separate members attached to the body that may be constructed of any strong non-flexible material which will stand up under the heat that is produced within the body 18 by a plurality of cartridge type electrical heating units 28. The backing plates may comprise a heat-insulating material if it has sufficient strength. The heating units 28 fit within recesses in the body extending from the exposed upper surface of the body 18. Preferably, the backing plates are not heat conductive but there is no serious objection to constructing them of steel (as was done in a practice of this invention), or other metallic material. It is essential that the heat insulators 21 and 22 be constructed of a material which is an efficient barrier for the heat since a primary feature of the present invention is that heat generated within the body 18 shall reach the thermoplastic sheet material. For this purpose, the body 18 has a centrally projecting portion or extension 30 which separates one backing plate from the other and each insulator from the other.

The heat passes from the body portion 30 into the plate 25 which is positioned thereagainst with its medial axis closely adjacent and parallel to, or lying within, a plane which bisects both platens and extend through the entire length of the path along which the edges are disposed between the platens. Most of the heat thus delivered to the plate 25 enters the material of the sheet sections 8 and 9 immediately adjacent the edges thereof brought together along the path indicated by the dotted line 32. A similar transfer of heat occurs within the platen 6 and the plate 33 disposed along the upper surfaces of the platen 6. Thus heat may be simultaneously supplied to the abutting portions of the sheet sections 8 and 9 from opposite directions by both platens. The opposing surfaces of the platens are preferably recessed to a depth equal to the thickness of the plates 25 and 33 to receive the plates 25 and 33. That is, on platen 7, parts of the surfaces of the insulators 21 and 22 are recessed and the projecting portion 30 of the body 18 extends only to the bottom plane of the recessed surfaces of the insulators. The resulting recess, as provided by the recessed portions of the insulators and the shortened projection of the body, has a depth approximately equal to the thickness of the plate 25.

In operation, the cartridge heaters 28 heat the metallic bodies of the platens 6 and 7 which in turn heat the plates 25 and 33 most intensely along the portions thereof in engagement with the projections of the bodies. Thus, the material of the sheets 8 and 9 which is disposed immediately between the projections is initially and most intensely heated, and reaches the fusion temperature of such material before other portions of the sheets. The sheets 8 and 9 are normally placed between the platens with their edge portions in abutting relationship. Preferably, the edges are trimmed accurately to conform to a straight line whereby they extend in substantially continuous contact. However, the edge portions may be placed in slightly overlapping relationship, particularly, if the edges are not likely to provide continuous contact when abutted. If the upper platen may settle by its own weight, as illustrated, the platen and the plate 25 settle into general contact with the sheets 8 and 9 as fusion of the overlapping edge portions is obtained and one sheet settles into the plane of the other. In carrying out this practice, material in excess of that needed to form a joint agreeing in thickness with that of the parent sheets will tend to flow lengthwise of the joint (widthwise of the sheets) and be extruded at the right and left sides of the platens as viewed in Fig. 1. Excess material may then be trimmed from the jointed product after it has cooled.

Heating is maintained for a period and at a temperature such as to cause complete fusion and coalescence of the material adjacent the abutting edges of the sheets. However, on account of the conductivity of the metal plates, fusion and molding of the sheet material progresses in a direction away from the abutting edges. However, the heating is controlled preferably so that fusion does not progress beyond the edges of the plates 25 and 33. By restricting the fusion of the material to an extent that does not extend beyond the width of the plates 25 and 33, the thickness of the sheet material through the joint section may be accurately maintained and the opposite surfaces of the joined sheet material kept free from mold marks. A highly satisfactory joint is obtained when the heating is so controlled as to extend the fusion of the material actually in contact with the plates in opposite directions from the path 32 to lines about half-way between the path and the edges of the plates. In Fig. 3, V shaped lines 35 and 36 indicate the boundaries between the material that becomes fused while joining the sheets 8 and 9 and the material thereof that remains unfused. The fused material is indicated by the area having the finer cross hatching. As some thermoplastic materials soften before actually fusing, caution should be observed in applying heat to edges to be joined so that heating does not progress to the point of softening the sheets adjacent the edges of the plates, since, regardless of the workmanship used in building the apparatus, it is virtually impossible to avoid mold marks in a softened plastic material where one molding surface joins with another.

Satisfactory operation of the invention has been obtained with insulators 21 and 22 comprising cork, however much harder insulating materials may be used such as porous ceramic refractory material. Materials also available for this purpose are laminated structures comprising a resinous binder and fabrics of glass or vegetable fibers.

A joint made as herein described may be cooled below the fusion temperature of the thermoplastic material of the sheets by allowing the entire apparatus to cool. However, a preferable and more rapid way is to raise the movable platen 7 and gently lift the assembly comprising the joined sheets 8 and 9, and the plates 25 and 33 in adherent relation with the fused material from the lower platen to another support. After the heated and previously fused material is cooled to a temperature below the fusion point or the softening range of the material, the plates may readily be stripped from the joined sheets. To promote the separation of the plates from the material, the plates may be coated with a thin layer of polytetrafluoroethylene. However, some adhesion of the plates within the fused material of the sheets is desirable to facilitate the removal of the assembly of the joined sheets and the plates from the apparatus, since at this time, the plates still serve to support the material of the joint in its uncooled fused condition.

The apparatus and the method just described are excellent for obtaining smooth-surface joints in polyethylene sheetings such as used in the fabrication of processing belts. Of the thermoplastic materials that are provided in sheet form and which may be readily processed in accordance with the present invention are resinous polymers of vinyl chloride, vinylidene chloride, vinyl esters, copolymers and mixtures of polymers of such monomers, thermoplastic cellulose esters, polyesters such as polyethylene terephthalate, and the polyamides commonly known as nylon. Joints made in the connecting of sheets of such materials are uniform in thickness because the apparatus utilizes the thickness of the unfused parent sheets for determining the thickness of the joint. That is to say, the plates extend as a bridge of inflexible molding members across either side of an unfused portion of one sheet to an unfused portion of the other sheet. The heat is applied in a specific manner to restrict fusion in the desired path along which the edges of the unjoined sheets are disposed.

Fig. 4 is a fragmental section view of a modified apparatus for joining sheets 41 and 42 placed between platens 43 and 44 with the edges of the sheets in abutting relationship along a path of juncture 45. The apparatus of Fig. 4 illustrates the applicability of the present invention for joining sheets of a thermoplastic material in producing a non-rectilinear or non-planular product. The sheets 41 and 42 may be heat-treated by the two platens 43 and 44 whereby the joined product thereof, when cooled, will take a permanent angle substantially as provided by the V shaped contour of the opposing surfaces of the platens. Platen 43, for example, comprises a heat-conducting body having a central portion 48 heated by a plurality of heaters 49. Integral with the portion 48 are webs 51 and 52 which join with flat backing portions 54 and 55. Heat insulators 56 and 57 are secured to the backing portions 54 and 55 but are separated by the central heatable portion 48. The platen 44 is of similar general construction although adapted to provide mating contour for the platen 43. As hereinbefore described as with respect to the embodiment of Figs. 2, 3, and 4, the platens of Fig. 4 effect the joining of two thermoplastic sheets in cooperation with plates which fit into the opposing surfaces of the platens. Heat conducting plates 61 and 62 of V cross section extend along the opposing surfaces of platens 43 and 44 respectively. Surfaces of both platens are recessed along planes extending obliquely from a bisecting plane of the platens. The embodiment of Fig. 4 is illustrative of the manner in which the present invention may be employed to join sheet material into a non-rectilinear product of angular or curved contour. Products that have different degrees of angularity or roundness may be obtained by platen surfaces shaped into a corresponding contour.

Fig. 5 illustrates another type of platen arranged in accordance with the present invention which may be used to form joints in sheetings of thermoplastic material. The heat-conductive plates thereof which are held in direct contact with the sheet material during fusion are integral portions of the platens and are adapted to receive a liquid or gaseous coolant after, and if desired, during the application of heat to the sheeting material. Fig. 5 illustrates in section, a platen 70 having a body 71 provided with a plurality of bores for receiving a like number of electrical heating elements 72. As hereinbefore described with respect to the other embodiments of the invention, the metallic body 71 of the platen has an extension 73 which is elongated in a direction extending perpendicularly to the plane of section of Fig. 5. The body extension 73 separates two insulating plates 74 and 75 but engages in heat transfer relationship a thin metallic heat-conducting plate 76. Similarly, as found in the other embodiments, the body extension 73 is the sole path for conducting heat from the heaters 72 and the body 71 into the plate 76. As the plate 76 has a plurality of ducts 78 extending entirely lengthwise of the plates parallel to the direction of the body extension 73 for conducting a liquid coolant through the plate, the insulating material constituting the insulators 74 and 75 is preferably molded to the surface of the plate 76 and this assembly attached to the body 71 to form an integral unit.

In practice, a pair of platens, constructed in the manner of platen 70, are supported in opposed relationship against opposite sides of a sheeting material such as that held between platens 6 and 7 in Fig. 3. After fusion of the material and the forming of a completely coalesced joint is effected, the platens may receive a liquid coolant passing through the ducts 78 and a passageway 79 extending through the body extension 73 to quickly cool the sheeting material while held by the platens to a temperature below that of fusion for the material thereof. The platens are preferably coated with a non-sticking compound, such as a polytetrafluoroethylene coating as illustrated by the layer 81 of the platen 70. With a platen of this type, a liquid coolant may be circulated through certain of the ducts 78 while preventing the passage of coolant through the other ducts. For example, the coolant may be circulated through ducts 79a and 79b during the heating of the platen 70 to assure that fusion or softening of the sheet material will not progress completely to the edges of the plate 76.

While preferred embodiments of the invention have been shown and described, it is to be understood that changes and variations may be made without departing from the spirit and scope of the invention as defined in the appended claims.

We claim:

1. Apparatus for joining adjacent portions of thermoplastic sheet materials comprising a pair of cooperating heat-conductive bodies disposed in opposing relationship and adapted for relative movement in directions toward and away from each other, an elongated extension formed integrally with each of said heat-conductive bodies, said extensions disposed in aligned relationship and projecting toward each other, a pair of flat thin heat-conductive plates, said plates being fixed at approximately a middle section thereof to the ends of each of said extensions with lateral portions of said plates disposed in spaced relationship with portions of its respective heat-conductive body, means for heating said heat-conductive body, thermal insulation interposed between the lateral portions of said plates and its respective body, and a plurality of spaced ducts formed in said heat-conductive plates and adapted to convey a cooling fluid.

2. Apparatus as defined in claim 1 further including a duct passing through each of said extensions, said last mentioned ducts each extending parallel and adjacent to its respective heat-conductive plate and adapted to convey a cooling fluid.

References Cited in the file of this patent

UNITED STATES PATENTS

| | | |
|---|---|---|
| 2,574,094 | Fener et al. | Nov. 6, 1951 |
| 2,621,704 | Langer | Dec. 16, 1952 |
| 2,719,567 | Gardner | Oct. 4, 1955 |
| 2,762,420 | Stanton | Sept. 11, 1956 |
| 2,766,809 | Parham | Oct. 16, 1956 |